United States Patent [19]  [11] Patent Number: 5,055,348
Kataoka et al.  [45] Date of Patent: Oct. 8, 1991

[54] REFRACTORY FIBER SPACIAL STRUCTURE AND MANUFACTURING METHOD THEREOF

[75] Inventors: Keiichi Kataoka, Suita; Shuji Tamura, Otsu, both of Japan

[73] Assignee: Asahi Kasei Kogyo Kabushiki Kaisha, Osaki, Japan

[21] Appl. No.: 368,883

[22] Filed: Jun. 20, 1989

Related U.S. Application Data

[63] Continuation of Ser. No. 58,863, Jun. 5, 1987, abandoned.

[30] Foreign Application Priority Data

Sep. 4, 1986 [JP] Japan .................................. 61-206726
Dec. 11, 1986 [JP] Japan .................................. 61-293506

[51] Int. Cl.$^5$ .......................... B32B 3/06; B32B 3/26; B32B 9/00
[52] U.S. Cl. .................................. 428/307.3; 428/245; 428/253; 428/254; 428/260; 428/262; 428/263; 428/289; 428/304.4; 428/306.6; 428/311.1; 428/311.5; 428/318.4; 428/318.6; 428/376; 428/698; 428/699
[58] Field of Search ............... 428/698, 699, 375, 288, 428/408, 245, 253, 254, 260, 262, 263, 304.4, 307.3, 304.6, 289, 376, 318.4, 318.6, 311.1, 311.5

[56] References Cited

U.S. PATENT DOCUMENTS

B 502,773  1/1976  Sowman .
2,699,415  1/1955  Nachtman .
3,385,915  5/1968  Hamling .................................. 427/5
3,403,008  9/1968  Hamling .
3,529,044  9/1970  Santangelo ........................... 501/95
3,644,135  2/1972  Speyer .................................. 427/228
3,766,000 10/1973  Gibson et al. .
3,889,348  6/1975  Lemelson ........................ 428/294 X
4,396,663  8/1983  Mitchell ......................... 428/360 X
4,397,901  8/1983  Warren .......................... 427/228 X
4,500,602  2/1985  Patten et al. ..................... 428/698 X
4,640,848  2/1987  Cerdan-Diaz et al. ............ 427/426

FOREIGN PATENT DOCUMENTS 0019469 11/1980  European Pat. Off. .
2055356A  3/1981  United Kingdom .
WO83/02291  7/1983  United Kingdom .

Primary Examiner—Lorraine T. Kendell
Attorney, Agent, or Firm—Finnegan, Henderson, Farabow, Garrett & Dunner

[57] ABSTRACT

A refractory fiber spacial structure having a porous structure and constituted by refractory fiber-like materials comprising a core portion constituted by a refractory crystalline compound B and a skin portion constituted substantially by a refractory crystalline compound A, and both compounds A and B are in a sintered state in the refractory fiber spacial structure and a portion of the refractory crystalline compound A is impregnated in the sintered state into the core portion, so that a rigid form having a strong compression strength is provided for the refractory fiber spacial structure.

4 Claims, 6 Drawing Sheets

REFRACTORY FIBER SPACIAL STRUCTURE AND MANUFACTURING METHOD THEREOF

This application is a continuation of application Ser. No. 07/058,863, filed June 5, 1987, and now abandoned.

BACKGROUND OF THE INVENTION

1. Field of the Invention

This invention relates to a refractory fiber spatial structure and a method of manufacturing a refractory fiber-like material.

More particularly, this invention relates to a refractory fiber-like material, refractory fiber spatial structures constituted with the refractory fiber-like material, having a rigid form and capable of use for applications such as a heat-resistant filter, a chemical-resistant filter, an exhaust gas filter for a gasoline engine, a particulate filter for a diesel engine, a filter for a melting metal, a catalyst carrier, a carrier for fixing a microbe or an enzyme, a structure of a fiber-reinforced metal or the like, and a refractory fiber spatial structure with a heating element, and in addition, a method of manufacture thereof.

2. Description of the Related Art

Since a refractory fiber-like material has an excellent resistance to high temperatures, excellent resistance to corrosion, and a high tenacity, it is well known that the refractory fiber-like material is suitable for use as a heat-resistant filter, chemical-resistant filter, exhaust gas filter, filter for a melting metal, catalyst carrier, and structure of a fiber-reinforced metal or the like. For example, utilization of the refractory fiber spatial structure constituted of a refractory fiber-like material, as a high temperature dust collecting filter, is disclosed in "New Fibers and Fabrics in Hot Gas Fabric Filtration", Journal of Industrial Fabrics, Volume I, Page 44 to 48.

Since the conventional refractory fiber-like material and the conventional refractory fiber spatial structure constituted by the refractory fiber-like material are relatively flexible, they are suitable for applications such as a bag filter, but are not suitable for applications such as a fixed type filter, a fixed bed type catalyst carrier, a fixed bed type carrier for fixing a microbe or an enzyme or the like. Further, when the conventional fiber spatial structure is used as a structure of the fiber-reinforced metal, there is a disadvantage in that the structure is easily deformed when pouring a melted metal into the fiber spatial structure.

If a rigid form or structure is applied to the refractory fiber spatial structure, the refractory fiber spatial structure is not easily deformed, and further, the refractory fiber spatial structure constituted by the refractory fiber-like material has a large surface area within itself; namely, this structure is porous. Therefore, if a refractory fiber spatial structure having a rigid form can be obtained, this refractory fiber spatial structure would be a most suitable structure for the above-mentioned application. However, such a refractory fiber spatial structure having a rigid structure is not known as of now.

For example, U.S. Pat. No. 3,849,181 disclosed a refractory fiber-like material and a method of manufacture thereof. The refractory fiber-like material disclosed in this U.S. Patent is made by coating a fiber of refractory crystalline oxide with a glass, and this fiber includes a tow, a staple fiber, and a filament. This fiber-like material has a high tenacity because, when the fiber-like material is stretched, cracks on a surface of the fiber-like material rarely occur, compared with a fiber-like material manufactured only of the refractory crystalline oxide. However, since the form of this refractory fiber-like material is not rigid, a structure manufactured by this material can be easily deformed by an outer force. Further since this fiber-like material has little flexibility, it is difficult to form a fiber spatial construction into an optional form, which can be easily obtained when an conventional organic fiber is used. Even if the fiber-like material is protected by applying an oil or a resin onto the fiber-like material, only a woven fabric having a relatively simple design can be obtained. Further, the fiber-like material is easily broken by bending of the fiber-like material by guides and/or reeds during manufacture of the woven fabric, so that the quality of the obtained woven fabric, and the productivity thereof, become inferior. When a knitted fabric and a nonwoven fabric are formed by using this fiber-like material, the same problems arise, and it is impossible to effectively utilize the high tenacity of the fiber-like material except when the fiber-like material is formed in a state such that the fiber-like material is bent with a relatively small curvature to the knitted fabric or the nonwoven fabric. Further, the fiber spatial structure having a relatively simple design and used with this fiber-like material having little flexibility does not have a rigid form, and is flexible and easily deformed, so that this fiber spatial structure is not suitable for the above-mentioned application.

U.S. Pat. No. 3,385,915 discloses a method for manufacturing a refractory oxide fiber and a structure constituted by the refractory oxide fiber by impregnating a metal compound into an organic fiber or a structure constituted by the organic fibers, and burning them. U.S. Pat. No. 3,406,025 discloses a method for manufacturing a structure constituted by nitride fibers by impregnating a metal compound into a structure constituted with the organic fibers, and after resolving the organic fibers from the structure, burning the structure in a compound including a nitrogen. Further, U.S. Pat. No. 3,403,008 discloses a method for manufacturing a structure constituted by carbide fibers by impregnating the metal compound into a structure constituted by the organic fibers and burning the structure in a non-oxidative atmosphere. Since organic fibers having flexibility are used to manufacture basic fiber spatial structures in the three above-mentioned methods, refractory fiber spatial structures having an optional form can be obtained. However, the compression strength of the refractory fiber spatial structures manufactured by the three above-mentioned methods is extremely low, and the fiber-like materials constituting the refractory fiber spatial structure are relatively soft, and thus the refractory fiber spatial structures per se are also flexible. If the compression strength of the refractory fiber spatial structure is low, a shape or a form of the fiber spatial structure is easily destroyed, and therefore, the refractory fiber spatial structure having a low compression strength is at a great disadvantage in the above-mentioned applications, and the flexibility of the refractory fiber spatial structure is also not suitable for the above-mentioned application. The reason why the compression strength of the refractory fiber spatial structure manufactured by the three above-mentioned methods is low is not clear, but it appears that an inorganic material remaining after the organic material is dissolved forms a fiber in a cast-off skin state, and a binding force cannot be generated between inorganic fine particulates formed during the above-mentioned procedure.

SUMMARY OF THE INVENTION

A first object of the present invention is to provide a refractory fiber-like material having a rigid form.

A second object of the present invention is to provide a refractory fiber spatial structure having a rigid form and constituted by the refractory fiber-like material.

A third object of the present invention is to provide a composite structure comprising the refractory fiber spatial structure having the rigid form and a heating element integrated with the refractory fiber spatial structure in such a manner that the two are piled together A fourth object of the present invention is to provide a preferable method of manufacturing the refractory fiber spatial structure having the rigid form.

In accordance with the present invention, the first object can be attained by a refractory fiber-like material comprising a core portion constituted by a refractory crystalline compound B and a skin portion constituted substantially by a refractory crystalline compound A formed by applying a refractory crystalline compound material A, i.e., a refractory crystalline compound or a precursor thereof, on a surface of the core portion and burning them. The refractory crystalline compound A and the refractory crystalline compound B constituting the refractory fiber-like material are brought to a sintered state by the above-mentioned burning process, and a portion of the refractory crystalline compound A is impregnated in the sintered state in the core portion.

The second object of the present invention can be attained by a refractory fiber spatial structure having a porous structure and constituted by refractory fiber-like materials comprising a core portion constituted by a refractory crystalline compound B and a skin portion constituted substantially by a refractory crystalline compound A formed by applying a refractory crystalline compound material A, i.e., a refractory crystalline compound A or a precursor thereof, on a surface of the core portion and burning them. The refractory crystalline compound A and the refractory crystalline compound B constituting the refractory fiber-like material are brought to a sintered state by the above-mentioned burning process, a portion of the refractory crystalline compound A is impregnated in the sintered state in the core portion, and a rigid form of the refractory fiber spatial structure is provided in such a manner that contacting surfaces of adjacent refractory fiber-like materials are bound to each other.

The third object of the present invention can be attained by a composite structure comprising a refractory fiber spatial structure having a porous structure and constituted by refractory fiber-like materials which are comprised of a core portion constituted by a refractory crystalline compound B and a skin portion constituted substantially by a refractory crystalline compound A formed by a applying a refractory crystalline compound material, i.e., a refractory crystalline compound or a precursor thereof, on a surface of the core portion and burning them. The refractory crystalline compound A and the refractory crystalline compound B constituting the refractory fiber-like material are brought to a sintered state by the above-mentioned burning process, and a portion of the refractory crystalline compound A is impregnated in the sintered state in the core portion, a rigid form of the refractory fiber spatial structure is provided in such a manner that contacting surfaces of adjacent refractory fiber-like materials are bound to each other, and a heating element is integrated with the refractory fiber spatial structure in such a manner that the two are piled together.

The fourth object of the present invention can be attained by a method for manufacturing a refractory fiber spatial structure comprising a first step in which a basic fiber spacing structure having a form corresponding to a form of the refractory fiber spacing structure to be manufactured is manufactured of an organic fiber-like material, a second step in which a precursor of a refractory crystalline compound B is applied on the basic fiber spatial structure and then the basic fiber spatial structure with the precursor of the refractory crystalline compound B is burned to make a refractory fiber spatial preform, and a third step in which a refractory crystalline compound material A is applied on the refractory fiber spatial preform and then the refractory fiber spatial preform with the refractory crystalline compound material A is sintered to make the refractory fiber spacing structure.

DESCRIPTION OF THE PREFERRED EMBODIMENTS

Figure 1:
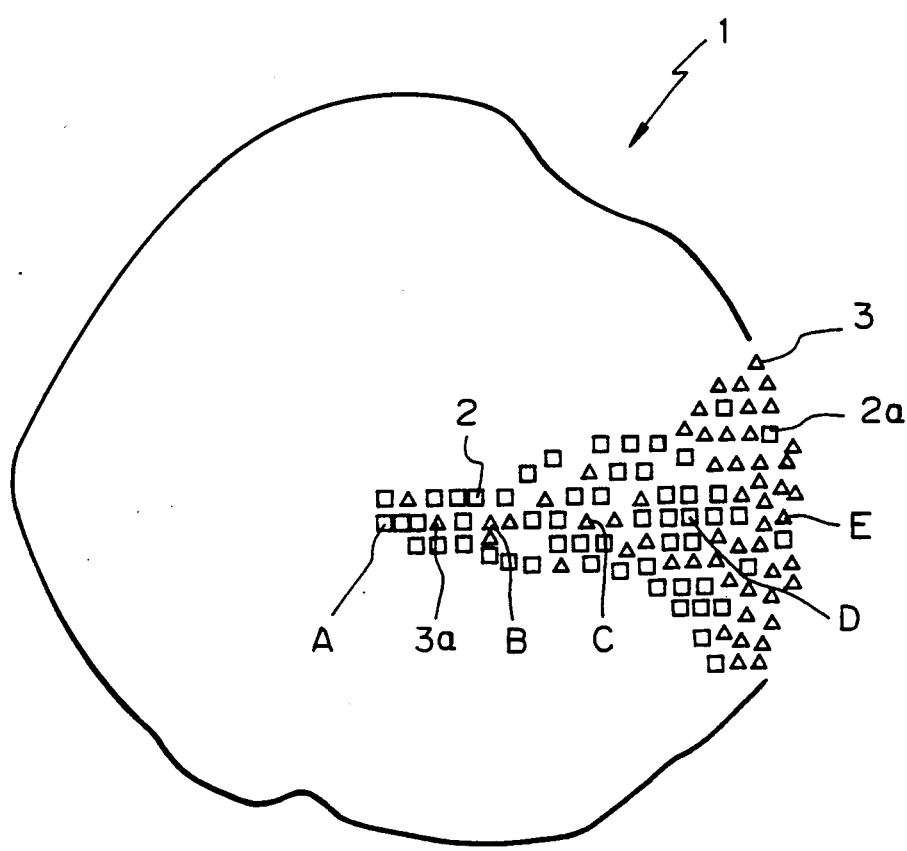
FIG. 1 is a view illustrating a state of arrangement of refractory crystalline compounds in a core portion and in a skin portion in a cross section of a fiber-like material constituting a refractory fiber spatial structure in accordance with the present invention.

The present invention will now be described in detail with reference to accompanying drawings illustrating embodiments of a refractory fiber spatial structure in accordance with the present invention.

A refractory crystalline compound A and a refractory crystalline compound B denoted in the present invention are a metal oxide described in Table 2.6 on page 59 of a Japanese edition issued by Uchida Rokakuho of "Introduction to Ceramics (second edition)" prepared by W. D. Kingery et al and issued by John Wiley & Sons, Inc. in 1976, a transition metal carbide, a transition metal nitride, a silicon carbide, a boron carbide, a silicon nitride, a boron nitride described on pages 76 to 77 of the above-mentioned Japanese edition, a mixture constituted by at least two substances from among the above-described substances, or a compound or a solid solution constituted by at least two substances among the above-described substances, and having a melting point or decomposition temperature of 500° C. or more. Especially preferable refractory crystalline oxides are BeO, MgO, SrO, BaO, $Sc_2O_3$, $Y_2O_3$, $La_2O_3$, $Ce_2O_3$, $TiO_2$, $ZrO_2$, $HfO_2$, $V_2O_3$, $Nb_2O_3$, $Nb_2O_5$, $Ta_2O_5$, $Cr_2O_3$, $SiO_2$, $MoO_3$, $WO_3$, $MnO_2$, $Co_2O_3$, $Ni_2O_3$, CuO, ZnO, CdO, $Al_2O_3$, CaO, $SnO_2$, $ThO_2$, $UO_3$, $Ga_2O_3$, or $PuO_3$, preferable refractory crystalline carbides are TiC, ZrC, HfC, VC, NbC, TaC, $Cr_3C_2$, $Mo_2C$, MoC, $W_2C$, WC, UC, $UC_2$, ThC, $ThC_2$, PuC, $PuC_2$, $B_4C$, $Al_4C$, or SiC, and preferable refractory crystalline nitrides are $Si_3N_4$, AlN, or BN. Further preferable refractory crystalline substances constituted with at least two oxides are mullite, corderite or spinal, and a preferable compound constituted by at least two substances from among the oxides, the carbides and the nitrides, is sialon.

A fiber-like material denoted in the present invention is a material having an elongated shape, such as a staple fiber, a filament, a tow, a spun yarn or the like, and includes a material manufactured of a refractory crystalline compound as described hereinafter, having an elongated shape and, sometimes, in a rigid form. A fiber spatial structure denoted in the present invention is a structure manufactured as a three dimensional form by using the fiber-like material, such as a woven fabric, a knitted fabric, a nonwoven fabric, or a structure manufactured by piling the above-mentioned fabric, and includes a structure constituted by the refractory fiber-like material.

To enable an easier understanding of the constitution of the refractory fiber-like material and the refractory fiber spatial structure in accordance with the present invention, a method of manufacturing the refractory fiber-like material and the refractory fiber spatial structure will be now described.

The method of manufacturing the refractory fiber-like material and the method of manufacturing the refractory fiber spatial structure are essentially the same, except that, in the method of manufacturing the refractory fiber spatial structure, a basic fiber spacing structure having a form corresponding to a form of the refractory fiber spacing structure to be manufactured is manufactured by using a fiber-like material, which is described in detail hereinafter, in an early manufacturing step.

Therefore, hereinafter, the method of manufacturing the refractive fiber spacing structure will be described, and a person with ordinary skill in the art will easily understand the method of manufacturing the refractory fiber-like material on the basis of the description explaining the method of manufacturing the refractory fiber spatial structure.

In a first step of manufacturing the refractory fiber spacing structure, the basic fiber spacing structure having a form corresponding to the form of the refractory spacing structure is manufactured by using the fiber-like material, as described hereinbefore. A fiber-like material of an organic fiber is usually used, but a fiber-like material of an organic fiber including a refractory crystalline compound or a precursor thereof, which is described in detail hereinafter, may be used.

The organic fiber denoted in the present invention includes a cellulose group fiber, a polyamide group fiber, a polyester group fiber, polyacrylic group fiber, a polyolefin group fiber, a polyurethane group fiber or the like. A preferable organic fiber used to attain the object of the present invention is the cellulose group fiber.

The basic fiber spatial structure may be manufactured by using a suitable structure-forming means to obtain a form corresponding to the form of the refractory spacing structure, e.g., a weaving loom, a knitting machine, a nonwoven manufacturing apparatus, or the like.

In a second step of the manufacturing method of the refractory fiber spatial structure, a precursor of a refractory crystalline compound B is applied to the basic fiber spatial structure, and then the basic fiber spatial structure including the precursor of the refractory crystalline compound B is burned to obtain a refractory fiber spatial preform.

The precursor of the refractory crystalline compound B denoted in the present invention is a substance capable of being changed to a refractory crystalline compound by a heat-reaction of the precursor in a specific atmosphere, e.g., an oxidative atmosphere for a refractory crystalline oxide, a nitrogen or an ammonia atmosphere for a refractory crystalline nitride, or a non-oxidative atmosphere for a refractory crystalline carbide.

For example, inorganic compounds such as chloride, hydroxide, sulfate, basic hydrochloride, basic sulfate, basic nitrate, ammonium salt, or the like, and organic compounds such as metallic halide, silane compound, or the like, can be used as the precursor. More particularly, an aluminum chloride, an aluminum sulfate, an aluminum nitrate, a basic aluminum chloride, a basic aluminum sulfate, a basic aluminum nitrate, a stannous chloride, a stannic chloride, a zirconium tetrachloride, a zirconium oxychloride, an yttrium chloride, a titanium trichloride, a nickel chloride, a magnesium chloride, a calcium chloride, an aluminum borate or the like can be used as the inorganic compound of the precursor. A basic aluminum acetate, a basic aluminum lactate, a tributyltin acetate, an aluminum acetate, a zinc acetate, a silane compound such as a trimethylchlorosilane, a trimethoxymethylsilane or the like, and an aluminum compound such as a polyaluminoxane or the like, can be used as the organic compound of the precursor.

The precursor may be absorbed into the organic fiber in a water solution or an organic solvent solution When the precursor can be used in a gaseous state, the precursor may be absorbed into the organic fiber in the gaseous state. The absorbing operation may be carried out by absorption alone or absorption by a chemical reaction. The organic solvent having a faculty of swelling the organic fiber may be preferably used. Further it is preferable to treat the organic fiber with a water or an organic solvent having the swelling faculty for the organic fiber, before the precursor is absorbed, to increase the quantity of absorption of the precursor into the organic fiber.

Known various swelling agents for the organic fiber can be used as the solvent used in the above-mentioned treatment. For example, water, methanol, ethanol, ethanolamine, ethylene diamine, formic acid, acetic acid, DMF, DMSO, a phenol group, chlorobenzene, acetic acid, toluene, xylene, chloroform, carbon tetrachloride, trichloroethylene, perchloroethylene or the like can be used for the above-mentioned purpose.

After the precursor is absorbed into the organic fiber, excessive precursor is removed from a surface of the organic fiber constituting the basic fiber spatial structure and the basic fiber spatial structure is dried.

Another fiber spatial structure including the refractory crystalline compound B or a precursor thereof can be manufactured by the following method. Namely, a refractory crystalline compound B or a precursor thereof is blended with an organic polymer and the blended polymer is spun to a fiber-like material by using a conventional suitable spinning means suitable for the polymer used, e.g., wet spinning, dry spinning, melt spinning, gel spinning or the like, to make the fiber-like material. The fiber spatial structure is manufactured by using this fiber-like material. The above-mentioned organic polymers include conventional polymers used as the substance for manufacturing an organic fiber, an organic silicone polymer, a polyaluminoxane or the like. Preferably, an ash content of the fiber-like material including the refractory crystalline compound B or the fiber precursor thereof is 10% or more and 95% or less against the oven dry weight of the fiber-like material. When the ash content is under 10%, a strength of the fiber-like material after the fiber-like material is burned to remove the organic fiber from the fiber-like material becomes weak and it is difficult to handle the fiber-like material in subsequent processes. Further, when the ash content is over 95%, the fiber-like material loses the organic fiber flexibility and becomes too brittle, and it is difficult to handle the fiber-like material in the subsequent processes.

The basic fiber spatial structure including the refractory crystalline compound B or the precursor thereof is burned to make a refractory fiber spatial preform of the refractory crystalline compound B. In this burning step, the organic fiber is decomposed and removed. The heating process for decomposing the organic fiber may be performed under a temperature at which the organic fiber does not ignite. The atmosphere used in this burning step is substantially identical to an atmosphere in which the corresponding refractory compound is burned. Namely air, nitrogen gas, ammonia gas, hydrogen gas, helium gas, argon gas, neon gas or the like, under a normal pressure, a vacuum, or the above-mentioned gas may be used under a pressure above the normal pressure for the above-mentioned purpose. A blended gas of two or more gases may be used. For example, when manufacturing the refractory crystalline oxide, an inert atmosphere may be used in an early stage of the burning process, and an oxidative atmosphere may be used in a latter stage of the burning process. When manufacturing the refractory crystalline nitride, the oxidative atmosphere may be used in the early stage, and a nitrogen-including compound atmosphere, i.e., an atmosphere including nitrogen, ammonia, organic amine group or the like, may be used in a last stage. Further, when manufacturing the refractory crystalline carbide, the oxidative atmosphere may be used in the early stage, and the inert atmosphere may be used in the last stage.

The burning conditions such as heating temperature, heating time or the like are different for each compound used, and are determined in such a manner that the fiber spatial preform of the refractory compound after the organic substance is removed has a sufficient strength for easy handling in a latter process. For example, the following heating temperature may be used for each compound.

| Name of Compound | Heating Temperature |
| --- | --- |
| $SnO_2$ | 600° C. ~ 800° C. |
| $Al_2O_3$ | Less or more than 700° C. |
| $ZrO_2$ | 600° C. ~ 800° C. |
| $SiN_4$ | 1300° C. ~ 1400° C. |
| AlN | Less or more than 1200° C. |
| SiC | Less or more than 1400° C. |

Preferably, the fiber-like material of the refractory crystalline compound B constituting the fiber spatial preform manufactured by the method described hereinbefore has a diameter between 1 μm and 3 mm. When a cross section of the fiber-like material is noncircular, the diameter is calculated as a diameter of a circle having a cross sectional area corresponding to a cross sectional area of the fiber-like material to be measured. Manufacture of a fiber-like material having a diameter of over 3 mm causes problems in the manufacturing process, and further, a feature of the fiber-like material or the fiber spatial structure in accordance with the present invention i.e., the feature that a large surface area thereof can be obtained by using the fiber-like material, is lost in the application of the material or the structure in accordance with the present invention when they are manufactured by using the fiber-like material having a diameter of over 3 mm. When the diameter of the fiber-like material is under 1 mm, the strength of the fiber-like material is too weak and cannot withstand treatments in a latter manufacturing process without fiber breakage.

Preferable, a porosity of the fiber-like material of the refractory crystalline compound B constituting the fiber spatial preform is between 5% and 50%. When the porosity is under 5%, penetration of a refractory crystalline compound A or a precursor thereof to be applied to the fiber spatial preform in a next or third manufacturing step is obstructed, and the manufacture of the refractory spatial structure having the features in accordance with the present invention becomes very difficult. When the porosity is over 50%, the strength of the fiber-like material becomes extremely weak and it cannot withstand treatments in a latter manufacturing process. A more preferable range of the porosity of the fiber-like material is between 15% and 40%. The porosity can be controlled by adjusting an ash content in the organic fiber and/or a burning condition. Of course, it is necessary to determine a suitable adjusting condition for each refractory crystalline compound or each precursor thereof used in the fiber spatial preform, to obtain a suitable porosity for the individual refractory crystalline compound or the individual precursor thereof.

A third step of the manufacturing method of the refractory fiber spatial structure is that a refractory crystalline compound material A is applied to the refractory fiber spatial preform and then the refractory fiber spatial preform including the refractory crystalline compound material A is sintered. A refractory crystalline compound A and/or a precursor thereof is used as the refractory crystalline compound material. The type of the refractory crystalline compound A and the precursor thereof used in the third step is essentially identical to that of the refractory crystalline compound B and the precursor thereof. The same refractory crystalline compound or the same precursor may be used as the refractory crystalline compound A and the refractory crystalline compound B or the precursor of the compound A and the precursor of the compound B. Of course, different compounds or precursors can be used as the compound A and the compound B or the precursor of the compound A and the precursor of the compound B. However, as preferable precursors, a basic aluminum lactate, a basic aluminum chloride, a basic aluminum sulfate, a basic aluminum nitrate, a basic aluminum acetate, a monobasic aluminum phosphate, an aluminum chloride, a silicon tetrachloride and a partial hydrolysis substance, a basic chrome chloride, a chrome chloride, a basic zirconium chloride, a zirconium tetrachloride, a tin chloride, an antimony chloride, an yttrium chloride or the like can be used.

The refractory crystalline compound A and the precursor thereof may be used in a blended state or two or more of the compound A and/or the precursor may be sequentially used. A form of a substance to be applied to the fiber spatial preform, i.e., the form of the compound or the precursor, is a liquid colloidal dispersion, a solution, a liquid, a vapor or the like and the form to be used is selected in accordance with the substance to be used. The substance should be dispersed in a molecular state or a colloidal particle state. The colloidal particle is a particle having a diameter of 0.1 $\mu$m or less. Since a greater part of the refractory crystalline compound A is insoluble in water, it is preferable to apply the compound A as the colloidal particle. For example, $SiO_2$, $TiO_2$, $ZrO_2$, MgO, PbO, $SnO_2$ can form a relatively stable colloidal dispersion, but the precursor of the refractory crystalline compound A can be applied as a molecular dispersion in a solution, a liquid or a vapor. When the substance to be applied is a dispersion or when the substance blended with the compound A or the precursors of two or more is used and is likely to precipitate, it is possible to prevent agglomeration of the substance by using a dispersant.

Various methods for applying the above-mentioned substances to the fiber spatial preform can be used. For example, a method for placing the fiber spatial preform in a vapor of the substance, a method for passing the fiber spatial preform in a dispersion, a solution, or a liquid of the substance, and a method for applying the substance on the fiber spatial preform by using a spraying device, a kiss roll, a rotogravure roll or the like may be used. When the substances are applied on the fiber spatial structure in the state of a dispersion, solution or liquid, residual portions thereof may be removed by absorption of a filter paper, centrifugal hydroextract, absorption hydroextract, flying using compressed air or the like. After the above-mentioned treatment, the fiber spatial preform applied with the above-mentioned substance is dried by heat.

Preferably, a degree of adhesion of the refractory crystalline compound A or the precursor thereof against a weight of the fiber spatial preform is between 1% and 50%, more preferably 2% or more. When the degree of adhesion is under 1%, it is impossible to obtain a refractory fiber spatial structure having a sufficient strength for practical use. While, when the degree of adhesion is over 50% the refractory fiber spatial structure becomes brittle because the crystal growth of the refractory crystalline compound A on a surface of the refractory fiber spatial structure is enhanced. Further since the fiber-like materials constituting the refractory fiber spatial structure are covered with a lot of the refractory crystalline compound A and a form of the fiber-like material applied essentially on the refractory fiber spatial structure in accordance with the present invention disappears, a feature wherein the refractory fiber spatial structure in accordance with the present invention is porous is lost. Therefore, it is necessary to determine the degree of adhesion as a minimum value in the range capable of increasing the form stability and compression strength of the refractory fiber spatial structure in accordance with the present invention.

Next, the fiber spatial preform applied with the refractory crystalline compound A or the precursor thereof is sintered.

The term "sintering" as used in the present invention denotes a process of heating an aggregate of a solid powder at a temperature under a melting point of a substance constituting mainly the solid powder, to harden the solid powder by burning, and a state obtained by the above-mentioned process. Namely, the sintering is a phenomenon or a process whereby, when the aggregate of the solid powder is heated at a high temperature, particles of the solid powder are bound to each other and become a block having mechanical strength. The sintering includes a solid phase sintering and a liquid phase sintering. The solid phase sintering denotes a binding between solid particles. There is a case wherein some melted substance is generated while heating the solid powder, when a specific blend of the solid powder is adopted. The liquid phase sintering denotes a densifying phenomenon occurring when some melted substance is included.

With regard to a condition of the sintering, an atmosphere, temperature, and processing time capable of sufficiently dispersing the refractory crystalline compound A or the precursor thereof applied on the fiber spatial preform into an inside of the fiber-like material constituting the fiber spatial preform, changing the precursor to the crystalline compound when the precursor is used in place of the refractory crystalline compound A, forming a solid solution or a new compound of the refractory crystalline compound A and the refractory crystalline compound B, and/or enhancing binding of interfaces of crystal particles of the refractory crystalline compound B, are selected. For example, a conventional atmosphere such as air, nitrogen gas, ammonia gas, hydrogen gas, helium gas, argon gas, neon gas, a vacuum or the like is used as the atmosphere in the sintering process. A mixture of two or more gases may be used. For example, when manufacturing a refractory crystalline oxide, an inert gas may be used in an early stage of the sintering process and an oxidative atmosphere may be used in a later stage of the sintering process. When manufacturing a refractory crystalline nitride, the oxidative atmosphere may be used in an early stage of the sintering process and a nitrogen including compound, i.e., nitrogen gas, ammonia gas, or organic amine may be used in a later stage of the sintering process. When manufacturing a refractory crystalline carbide, the oxidative atmosphere may be used in an early stage and the inert gas or a gas including a carbon used in a later stage of the sintering process. Under the above-mentioned conditioning atmosphere, a suitable temperature and a suitable processing time are selected.

The fiber spatial preform applied with the refractory crystalline compound A or the precursor thereof may be piled or formed to a desirable form or shape to obtain the refractory fiber spatial structure having a form suitable to an application before the sintering process. Namely, the above-mentioned fiber spatial preform before the sintering process is relatively flexible, and if necessary, the forming process can be applied to the fiber spatial preform. For example, the fiber spatial preform having a form such as a woven fabric, a knitted fabric or a nonwoven fabric can be made to a preform having a cylindrical form or can be applied with a wave-like form.

A heating element can be piled with one or more fiber spatial preform. Conventional various heat elements having a resistance to heat of more than about 800° C. can be used for this purpose. For example, a wire made of nickel-chrome alloy, iron-chrome-aluminum alloy, molybdenum disilicide, silicon carbide, tungsten carbide, tungsten, platinum or the like is used. Further, a refractory crystalline compound having a heat build-up property, e.g., compounds of a silicon carbide, molybdenum silicide or the like, or a composite thereof can be used.

Constructions or constitutions of the refractory fiber-like material and the refractory fiber spatial structure manufactured by the method described in detail hereinbefore will be described hereinafter.

The refractory fiber-like material in accordance with the present invention is a fiber-like material formed by applying a refractory crystalline compound material A on a fiber-like material made of a refractory crystalline material B and sintering them. At least one portion of the refractory crystalline compound A is penetrated into an inside of the fiber-like material of the refractory crystalline compound B, and both compounds A and B are integrated in the fiber-like material. Namely, the refractory fiber-like material has a skin-core structure comprising a core portion of the refractory crystalline compound B and a skin portion of the refractory crystalline compound A. However a clear borderline area is not provided between the core portion and the skin portion, and at least one portion of the refractory crystalline compound A penetrates from a surface of the core portion, so that an integrated state of the refractory crystalline compound A and the refractory crystalline compound B is formed in the refractory fiber-like material Further, a concentration of the refractory crystalline compound A in a cross section of the fiber-like material is gradually decreased from a surface of the refractory fiber-like material to a center thereof For example, a small quantity of the refractory crystalline compound A in the core may appear on the surface of the refractory fiber-like material.

It is possible to confirm that at least one portion of the refractory crystalline compound A penetrates from the surface of the fiber-like material to the center of the fiber-like material, by performing an analysis of an element by means of an X-ray microanalyzer. Namely it is possible to investigate a change of the concentrations of the elements constituting the fiber-like material by applying a point analysis of the X-ray microanalyzer to each point A, B, C, D and E in the cross section of the refractory fiber-like material illustrated in FIG. 1. FIGS. 3A to 3E show photographs of the cross section of the refractory fiber-like material when observed by an X-ray microanalyzer and each crossing point of a vertical line and a horizontal line in FIGS. 3A to 3E corresponds to each point A, B, C, D, and E in FIG. 1.

There is a case that composition of a refractory crystalline compound A is completely the same as that of a refractory crystalline compound B. In this case, it is possible to investigate a change of concentration of the refractory crystalline compound A and the refractory crystalline compound B by measuring the sizes of crystalline particles at each point A, B, C, D and E in FIG. 1 by a scanning type electron microscope, because the refractory crystalline compound A is usually applied in a colloidal state or a molecular dispersion state of the precursor, in a necessary minimum quantity, and the refractory crystalline compound A is formed as a crystalline fine particle smaller than that of the refractory crystalline compound B.

FIG. 1 is the model view illustrating the change of concentrations of the refractory crystalline compound A and the refractory crystalline compound B in a cross section of one example of the refractory fiber-like material 1 analyzed by the X-ray microanalyzer. In FIG. 1, 2 denotes the refractory crystalline compound B and 3 denotes the refractory crystalline compound A. As can be clearly understood, the refractory crystalline compound B can be on a surface of the refractory fiber-like material as shown by 2a, and the refractory crystalline compound A can be near to a center of the refractory fiber-like material.

It is possible to confirm whether or not the obtained fiber-like material is a crystalline material, by a wide angle X-ray diffraction. When a clear diffraction peak is obtained upon observing the X-ray diffraction by using a reflection method or a permeability method, it is deemed that the observed refractory fiber-like material is a crystalline material. An identification of the crystal can be obtained on the basis of a value of the angle of the diffraction peak. Further, it is possible to exactly confirm the existence of the crystal on the basis of an analysis of the element using the X-ray microanalyzer, and by observation using a scanning type electron microscope.

It is an important that the fiber-like material comprising the refractory crystalline compound B and constituting the fiber-like preform be manufactured by burning an organic fiber including the refractory crystalline compound B or the precursor and bringing the organic fiber to a cast-off skin state, since the thus obtained fiber-like material usually has a high porosity and weak bonding force between crystal particles, and thus cannot have a high compression strength, but the activity of a surface of the crystal particles is high. Therefore the refractory crystalline material A, i.e., the refractory crystalline compound A or the precursor thereof applied on the fiber spatial preform can easily penetrate into the fiber-like material of the refractory crystalline compound B and a strong bonding between the refractory crystalline compound B and the refractory crystalline compound A can be generated during the sintering process. Namely, since the refractory crystalline material A is in a state of a colloidal particle or a molecular dispersion, it appears that the refractory crystalline material A is changed through an extremely active intermediate to a crystal fine particle or a crystalline during the sintering process, so that the strong bonding between surfaces of the crystal fine particles of the refractory crystalline material B generated through the refractory crystalline compound A, a solid solution of the refractory crystalline material B and the refractory crystalline compound A, is formed, or a new crystalline compound is formed therebetween to make a strong bonding between crystal particles of the refractory crystalline compound B.

Since the refractory fiber-like material in accordance with the present invention has an internal construction of the fiber-like material described hereinbefore, the refractory fiber-like material has a rigid form and high compression strength caused by the strong bonding force. It is apparent that this feature cannot be realized merely by covering or filling the refractory crystalline material B with the fiber-like material of the refractory crystalline compound A. It has been proved that, even if quantity of the refractory crystalline compound A is relatively small, the above-mentioned feature can be obtained. On the contrary, when a lot of the refractory crystalline material A is used, since a growth of the crystal of the refractory crystalline compound A on a surface of the refractory fiber-like material is enhanced, cracks between the crystal particles are generated to make the fiber-like material very brittle.

The refractory fiber spatial structure in accordance with the present invention is constituted by a plurality of the above-mentioned refractory fiber-like materials in such a manner that the refractory fiber-like materials are substantially fixed together in the refractory fiber spatial structure. Namely the refractory fiber spatial structure has a strong binding generated through the refractory crystalline compound A or by generation of the solid solution between the refractory crystalline compound A and the refractory crystalline compound B or contacting surfaces between a plurality of the refractory fiber-like materials, and has a strong compression strength of, e.g., from 0.3 kg/cm$^3$ to 500 kg/cm$^3$, caused by the binding force generated inside the refractory fiber-like material itself and the binding force generated on the contacting surfaces thereof.

Since the refractory fiber spatial structure has a substantially porous structure and a strong compression strength, the refractory fiber spatial structure can be effectively used for various applications such as a heat-resistant filter or the like.

EXAMPLES

The present invention will be explained further by means of examples, which in no way limit the invention. The definitions and measurements of various characteristics, used throughout this specification, are as follows.

Tensile Strength and Tension Modulus (based on JIS L-1013)

Under the following conditions
Sample Length: 2 cm
Rate of Pulling (Constant Speed): 1 cm/min
Compression Strength (based on JIS K-7220)
Under the following conditions
  Rate of Compressing: 0.1 cm/min
  Pressure is applied to a fiber bundle in the direction perpendicular to the lengthwise direction of the fiber bundle.

Three-Point Bending Test

A three-point bending test is performed by a method of testing a flexural strength of a fine ceramic based on JIS R 1601, under the following conditions.

| | |
|---|---|
| Total Length of Sample $L_T$: | 70 mm |
| Width of Sample W: | 30 mm |
| Thickness of Sample t: | Optional |
| Distance between Supports L: | 30 mm |
| Speed of Cross Heating: | 0.5 mm/min |

The flexural strength is obtained as a mean value calculated from the following equation:

$$\text{Three-Point Bending Strength} = \frac{3PL}{2Wt^2}$$

wherein P stands for the value of a maximum load when the sample is broken.

Porosity

Porosity is represented by the following equation:

$$\text{Porosity (\%)} = \frac{\text{Apparent Specific Gravity} - \text{Volume Special Gravity}}{\text{Apparent Specific Gravity}} \times 100$$

The apparent specific gravity is obtained by using a sample of about 0.1 g and an air picnometer. A fiber-like material to be tested is heated at a temperature of 600° C. for 2 minutes. The sample is then ground to a powder by a mortise and a pestle, and a powder sample having a length of five times or less of a mean diameter of the fiber-like material is prepared and the content of the powder sample is minimized in an optional closed space. Thus a value of the apparent specific gravity which is the same or nearly the same as a true specific gravity of the sample is obtained.

The measurement of the volume specific gravity is performed as follows.

The sample is hung in a propane frame to measure a length of the fiber-like material. A microscope with a micrometer is used and the length of the fiber-like material is measured as the length the micrometer must be moved to scan a whole length of the fiber-like material.

When measuring the volume specific gravity of a fiber-like material having a tendency to be destroyed in the propane frame, the length of the fiber-like material may be measured by using an enlarged photograph of the fiber-like material. A diameter of the fiber-like material can be measured to a precision of $2.5 \times 10^{-3}$ mm by a microscope with an eye piece equipped with a wire. A weight of the sample is measured by a balance capable of measuring to a precision of $1 \times 10^{-7}$ g. A used minimum quantity of the fiber-like material is $1 \times 10^{-5}$ g.

The volume specific gravity of the fiber-like material having a circular cross section is calculated by the following equation.

$$\text{Volume Specific Gravity} = \frac{1.27 \times \text{Weight}}{(\text{Diameter})^2 \times \text{Length}}$$

The volume specific gravity of the fiber-like material having a noncircular cross section is calculated by the following equation:

$$\text{Volume Specific Gravity} = \frac{\text{Weight}}{\text{Cross Section} \times \text{Length}}$$

The ash content of the fiber-like material comprising an organic fiber and a refractory crystalline compound B or a precursor thereof applied on the organic fiber is represented by the following equation:

$$\text{Ash Content } W_B (\%) = \frac{W_1 (g)}{W (g)} \times 100$$

Wherein W stands for the oven dried weight of the fiber-like material comprising the organic fiber and the refractory crystalline compound B or the precursor thereof applied on the organic fiber, and $W_1$ stands for the weight of the above-mentioned fiber-like material when the material having the weight W is placed in a platinum crucible strongly heated to obtain a constant weight.

The organic substance of the material is then decomposed and the material becomes an ash.

Quantity of the Refractory Crystalline Compound applied against a Refractory Fiber Spatial Preform The above-mentioned quantity is represented by the following equation:

$$\text{Pick Up } W_A (\%) = \frac{W_3 - W_2}{W_2} \times 100$$

Wherein $W_2$ (g) stands for the oven dried weight of the fiber-like material of the fiber spatial preform, and $W_3$ (g) stands for the oven dried weight of the fiber-like material, wherein the refractory crystalline compound material A is applied on the fiber-like material of the fiber spatial form.

Analysis of Elements

An analysis of elements is performed by an X-ray microanalyzer comprising an electron microscope Type "JSM-T300" supplied by Nihon Denshi Co., Ltd. and an X-ray microanalyzer Type "EEDS-1" supplied by Ortec Co.

Confirmation of Crystal

Confirmation of a crystal is performed for a fiber-like material and a fiber spatial structure comprising the refractory crystalline compound B, and a fiber-like material and a fiber spatial structure to which the refractory crystalline compound A is further applied, by X-ray analysis. However, when a form or strength of the sample is weak, the sample is ground to a powder by a mortise and a pestle, and the confirmation of the crystal is performed for the powder.

Example 1

A rib knitted fabric having 6 courses/inch and 5 wales/inch is prepared by using three yarns of a viscose rayon filament 250 d/10 f in a 5GG flat knitting machine as a basic fiber spatial structure.

The basic fiber spatial structure is rinsed after being immersed in a stannic chloride solution of 30 wt % at a room temperature for 1 hour, and is rinsed after being immersed in a disodium hydrogen phosphate of 7 wt % at 60° C. for 1 hour. A weight of the basic fiber spatial structure is increased to 214% of an original weight of the basic fiber spatial structure by repeating the above-mentioned treatment five times. Further, the basic fiber spatial structure is immersed in a sodium silicate (No. 1) of 4 wt % and is rinsed to remove the excess sodium silicate. After this treatment, the weight of the basic fiber spatial structure is increased to 245% of the original weight of the basic fiber spatial structure. This basic fiber spatial structure is placed in a box type electric furnace, after being dried at 80° C. in a hot air dryer, to burn the basic fiber spatial structure. A temperature of the furnace in the burning process is raised to 400° C. in air for 50 hours, and then is raised from 400° C. to 800° C. for 4 hours, and further, is kept at 800° C. for 5 hours. The obtained fiber spatial structure, i.e., a refractory fiber spatial preform stated in this specification, has an ash content $W_B$ of 73% and a porosity of 31.3%. The refractory fiber spatial preform has a white color, and it is confirmed that this preform is a fiber spatial structure of a tin dioxide, by performing an identification of a peak by means of a wide angle X-ray. This refractory fiber spatial preform is shrunk from a size of the corresponding original basic fiber spatial structure to a small size, but a form corresponding to the original basic fiber spatial structure is kept. A structure of the refractory fiber spatial premove is extremely weak and cannot be measured. Namely, a compression strength of the refractory fiber spatial preform is as low as 50 g/cm$^2$ or less, but it is possible to use this preform in subsequent processes with careful handling.

Next, the following treatments are applied to the refractory fiber spatial preform to obtain a refractory fiber spatial structure.

The refractory fiber spatial preform is immersed in a suspending solution of 10 wt % of a blended material of an aluminum lactate and a silicon oxide, which blended material includes 26.5% of $Al_2O_3$, 12% of $SiO_2$ and 27% of lactic acid and supplied by Taki Kagaku Co., Ltd. as Takiselum 2500, and then an excess liquid is removed by placing the preform in contact with a filter paper. The pick up $W_A$ of the blended material on the refractory fiber spatial preform is 8.9 wt %. The refractory fiber spatial preform to which the blended material is applied is placed in the box type electric furnace after being dried at 100° C. in the hot air dryer to apply a sintering treatment to the refractory fiber spatial preform. A temperature of the furnace in the sintering process is raised to 400° C. in air for 5 hours, and then is raised from 500° C. to 1350° C. for 5 hours, and further, is kept at 1350° C. for 1 hour.

Clear diffraction peaks of a tin dioxide crystal and a mullite crystal are obtained when measuring a wide angle X-ray diffraction of the obtained fiber spatial structure, i.e., a refractory fiber spatial structure stated in this specification, and it is confirmed that the refractory fiber spatial structure is mainly comprised of the tin dioxide crystal and the mullite crystal. The refractory fiber spatial structure has a shrunken form of the original basic fiber spatial structure in a rigid state caused because bondings between refractory fiber-like materials constituting the refractory fiber spatial structure are partially generated.

As a comparative example 1, the following fiber spatial structure is prepared. Namely, the refractory fiber spatial preform used as an intermediate of Example 1 is immersed in a modified dimethyl polysiloxane (supplied by Shinetsu Kagaku Co., Ltd. as Polon MR) solution of 20 wt % and is dried. The preform is then heated in a propane flame and air for 5 seconds and a coating layer is vitrified. It is confirmed that the obtained fiber spatial structure is mainly comprised of a tin oxide, a mullite and an alumina by performing the identification of the peak by means of the wide angle X-ray.

Compression strengths of the Example 1 of the refractory fiber spatial structure in accordance with the present invention and Comparative Example 1 are measured and expressed in Table 1.

Further, a refractory fiber-like material is manufactured by applying the sintering process to a yarn pulled out from the refractory fiber spatial preform in the same sintering process as that used to manufacture the refractory fiber spatial structure. Also a vitrified yarn corresponding to Comparative Example 1 is prepared. The tensile strength and tension modulus of both yarns are measured and expressed in Table 1.

Table 1 shows that the expression strength, the tensile strength, and the tension modulus of the refractory fiber spatial structure of Example 1 are greatly improved. The yarn of Example 1 has clearly divided fibers which are stiff.

TABLE 1

|  | Thickness (mm) | Specific Gravity (g/cm$^3$) | Compression Strength (g/cm$^2$) | Tensile Strength (g/mm$^2$) | Tension Modulus (kg/mm$^2$) |
| --- | --- | --- | --- | --- | --- |
| Example 1 | 0.27 | 0.11 | 300 | 363 | 4820 |
| Comparative Example 1 | 0.23 | 0.10 | 150 | 120 | 410 |

The results of a point analysis performed for five points A to E indicated in FIG. 1 by an X-ray microanalyzer are expressed in Table 2. Table 2 shows that aluminum, which is a refractory crystalline compound essentially constituting a skin portion of the fiber-like material in accordance with the present invention, penetrates from a surface of the fiber-like material to an inside of the fiber-like material.

TABLE 2

| Number of Example | Condition | Name of Element | Positions to be measured | | | | |
| --- | --- | --- | --- | --- | --- | --- | --- |
|  |  |  | A | B | C | D | E |
| 1 |  | Sn | 98.94 | 96.23 | 96.31 | 96.67 | 47.96 |
|  |  | Al | 1.06 | 3.77 | 3.10 | 2.85 | 26.32 |
|  |  | Si | 0 | 0 | 0.59 | 0.48 | 25.72 |
| 3 |  | Al | 92.28 | 92.55 | 91.57 | 84.70 | 84.55 |
|  |  | Si | 7.72 | 7.45 | 8.43 | 15.30 | 15.45 |
| 4 | 1 | Al | 96.96 | 97.2 | 96.62 | 96.38 | 96.45 |
|  |  | Si | 0 | 0.54 | 1.38 | 3.01 | 3.35 |
|  |  | Ca | 3.04 | 2.26 | 2.00 | 0.61 | 0.20 |
|  | 4 | Al | 69.33 | 60.72 | 46.55 | 47.32 | 16.49 |
|  |  | Si | 0.73 | 0.32 | 0.48 | 0 | 0 |
|  |  | Zr | 29.94 | 38.96 | 52.97 | 52.68 | 83.51 |
|  | 5 | Al | 47.09 | 57.64 | 58.39 | 90.11 | 95.47 |
|  |  | Si | 45.49 | 33.84 | 34.75 | 8.87 | 3.66 |
|  |  | Mg | 7.42 | 8.52 | 6.86 | 1.02 | 0.87 |

Figure 2A:
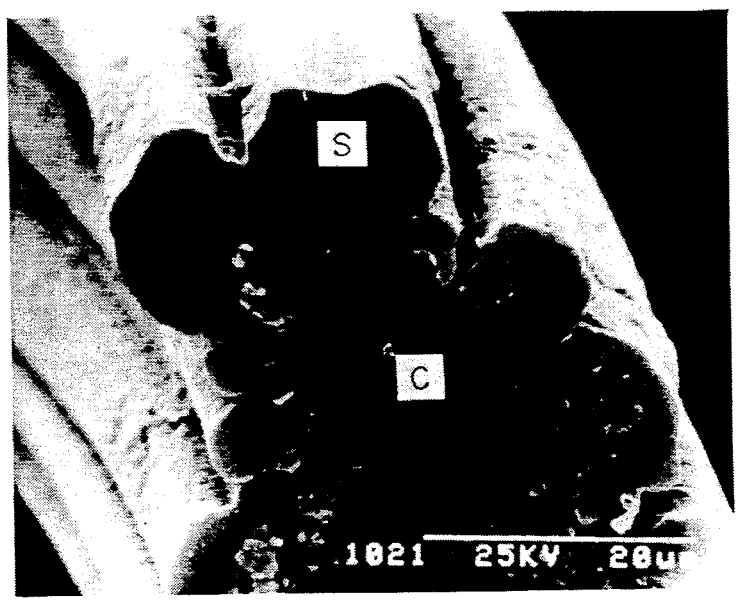
FIGS. 2A to 2C are photomicrographs of a cross section of a fiber-like material illustrating the cross sections changing from a burning process to a sintering process, respectively; and, FIGS. 3A to 3E are photographs of cross sections of the fiber-like material analyzed by using an X-ray microanalyzer, wherein each position indicated by the letters A to E in FIG. 1 is indicated by a cross point of a vertical line and a horizontal line in each photograph in FIGS. 3A to 3E.
Figure 2B:
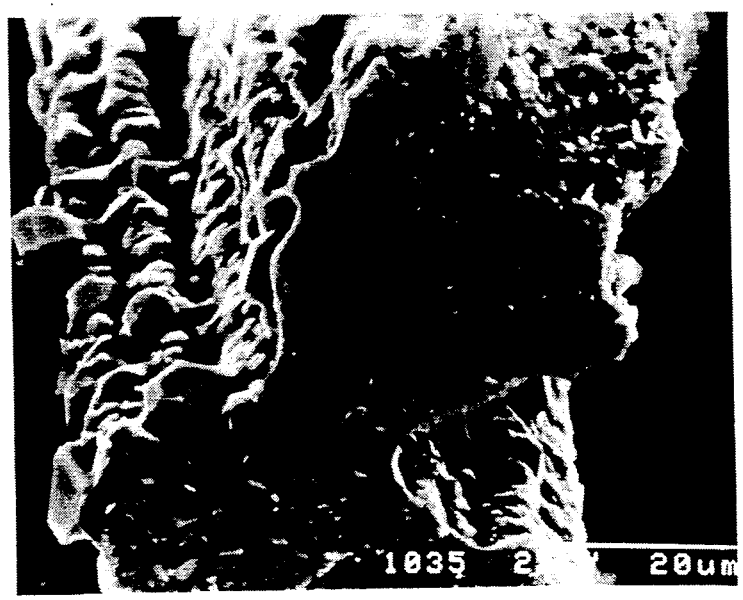
Figure 2C:
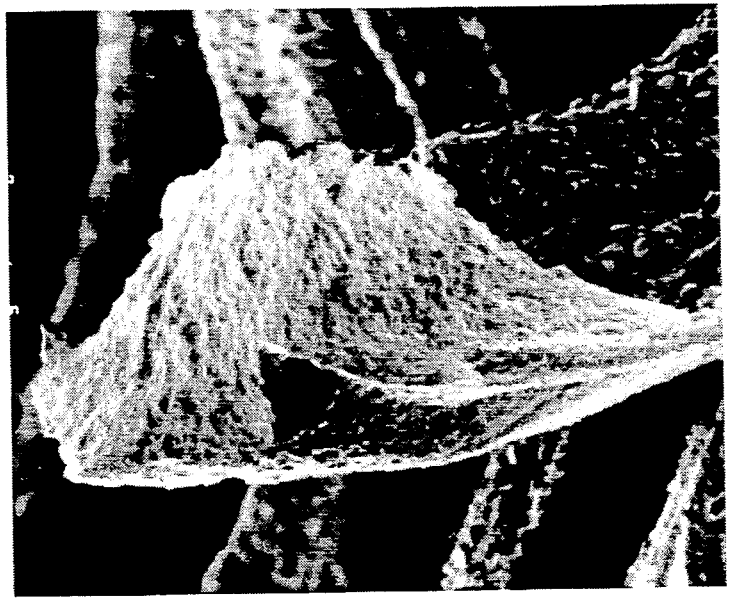
Figure 3A:
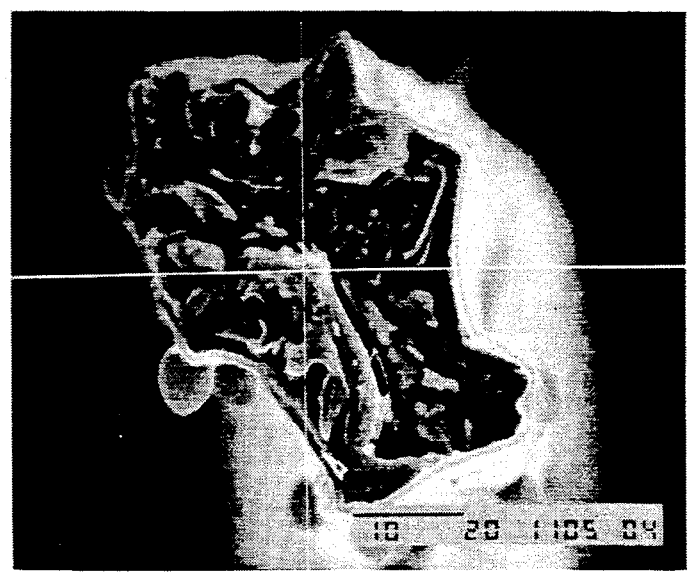
Figure 3B:
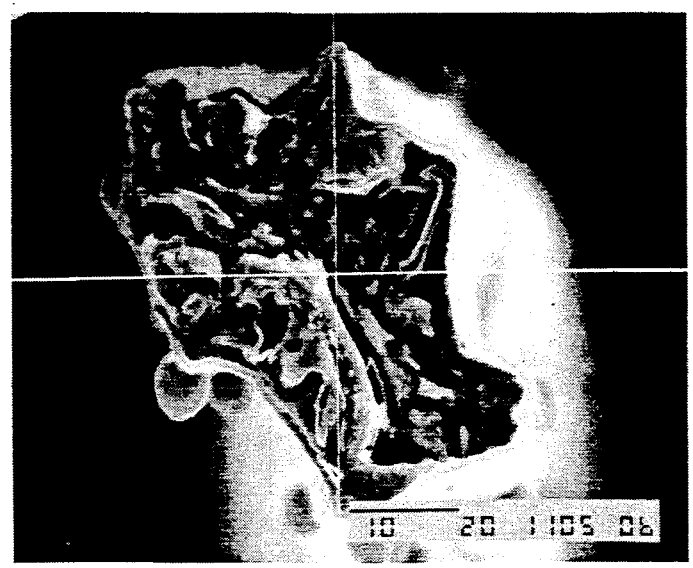
Figure 3C:
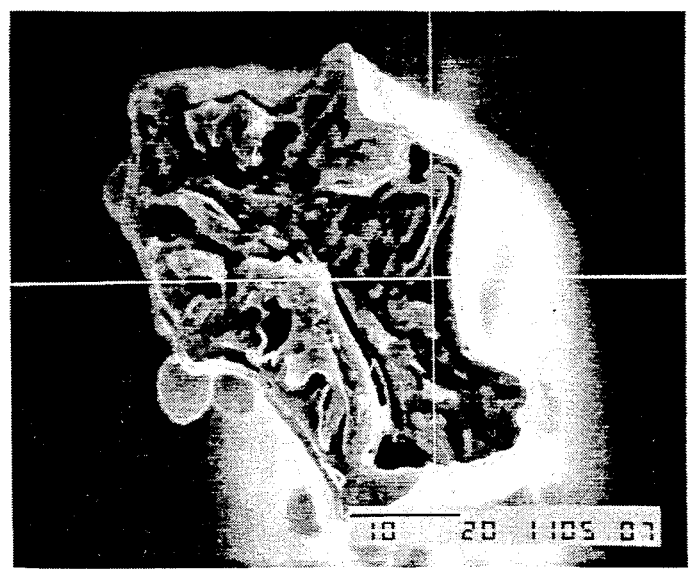
Figure 3D:
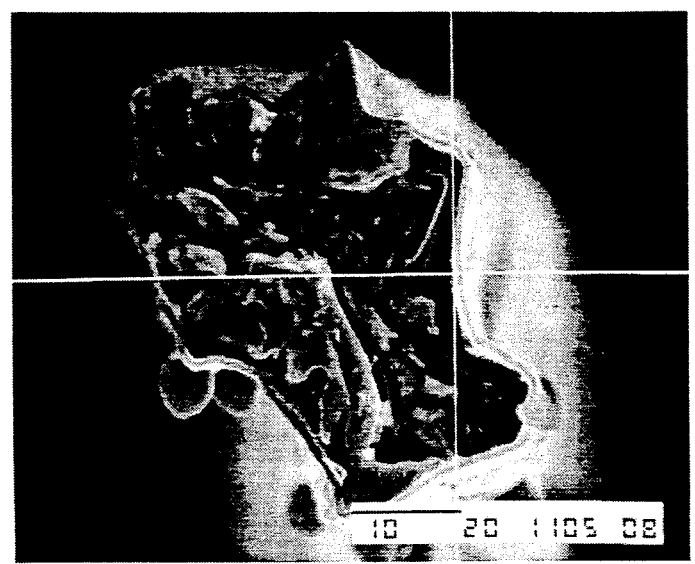
Figure 3E:

The changing state of cross sections of the corresponding fiber-like material to Example 1, from a burning process to a sintering process, are illustrated in electro microphotographs shown in FIGS. 2A to 2C. FIG. 2A is a microphotograph illustrating the cross section of the fiber-like material burned at 800° C. for 5 hours. FIG. 2A shows that the construction of fibers of the viscose rayon filaments used for manufacturing the basic fiber spatial structure remains. A portion indicated as "S" in the microphotograph is a skin portion of the burned fiber-like material and has a dense construction after receiving the burning process. A portion indicated as "C" in the microphotograph is a core portion of the burned fiber-like material and has a porous construction after receiving the burning process.

FIG. 2B is a microphotograph illustrating the cross section of the fiber-like material taken out from the electric furnace when the temperature during the sintering process rose to 1300° C., and shows a state wherein crystal particles are about to grow in an outside surface of the fiber-like material, and the growing of the crystal and a sintering phenomenon have already started in an inside layer of the fiber-like material. Although the above-mentioned phenomenon is not suitable for all cases, since the skin layer is denser as shown in FIG. 2A, it appears that the growing of crystal particles and the sintering phenomenon is advances more rapidly in the outside surface, than in the core layer.

FIG. 2C is a microphotograph illustrating the cross section of the sintered fiber-like material. As can be seen from the microphotograph, the fiber-like material becomes extremely dense.

EXAMPLE 2

A rib-knitted fabric having 17 courses/inch and 14 wales/inch is prepared by using two yarns of a viscose rayon filament 120 d/8 f in a 10GG flat knitting machine as a basic fiber spatial structure.

The basic fiber spatial structure constituted with the viscose rayon filament yarns including a precursor of a refractory crystalline compound and having an ash content $W_B$ of 81%, is obtained by applying the same treatment as that used for the basic fiber spatial structure in Example 1. The basic fiber spatial structure with the precursor is burned by the same treatment as that used in Example 1, except that the time for which the basic fiber spatial structure is kept at 800° C. is changed from 1 hour to 20 hours, to obtain a refractory fiber spatial preform. A state of the crystal, change of the form, and strength of the obtained refractory fiber spatial preform are substantially identical to those of Example 1.

A refractory fiber spatial preform is applied with the same refractory crystalline compound material as that used in Example 1, except that the concentration of the material solution is changed as shown in column A of Table 3 and the pick up $W_A$ of the material solution is changed as shown in column B of Table 3.

Further, a comparative example for this Example 2 is prepared by using only water in place of the refractory crystalline compound material used for Example 2.

Next, five sheets of the refractory fiber spatial preform with the refractory crystalline compound material are placed in a box type electric furnace in a piled state and are sintered in air to obtain a refractory fiber spatial structure. A temperature of the furnace in the sintering process is raised to 800° C. for 8 hours and then from 800° C. to 1200° C. for a half hour, and further, is raised from 1200° C. to 1400° C. for 2 hours, and finally, is kept at 1400° C. for 1 hour. A state of a crystal of the obtained refractory fiber spatial structure is the same as that of Example 1.

A three-point bending strength of the piled refractory fiber spatial structure is shown in column C of Table 3. As can be seen from Table 3, when the pick up $W_A$ is more than 1%, the strength is increased. The strength is further increased upon increasing the pick up $W_A$, and the appearance of the piled refractory fiber spatial structure is kept in a state piled with a refractory fiber spatial structure having a shrunken form of the basic fiber spatial structure and the piled refractory fiber spatial structure is made rigid because the fiber-like materials constituting the piled refractory fiber spatial structure are partially bonded. When the pick up $W_A$ becomes near 40%, a part of the fiber-like material becomes a monofilament-like material because it is covered with the refractory crystalline compound, but the features of the fiber spatial structure are still kept. However, when the pick up $W_A$ becomes near 70%, since the fiber spatial structure itself is completely covered with the refractory crystalline compound applied in the sintering process, the refractory fiber spatial structure in this case loses the features thereof and becomes a plate-like material.

TABLE 3

| Testing No. | A Concentration of Refractory Crystalline Compund Material (%) | B Pick up $W_A$ (%) | C Three Point Bending Strength (kg/cm$^2$) | D Appearance of Fiber Spacial Structure |
| --- | --- | --- | --- | --- |
| 1 | 0 | 0 | 0.50 | Fiber Spacial Structure |
| 2 | 1 | 0.9 | 0.80 | Fiber Spacial Structure |
| 3 | 2 | 1.2 | 2.53 | Fiber Spacial Structure |
| 4 | 4 | 2.8 | 10.84 | Fiber Spacial Structure |
| 5 | 8 | 7.3 | 12.20 | Fiber Spacial Structure |
| 6 | 12 | 11.3 | 14.07 | Fiber Spacial Structure |
| 7 | 20 | 19.7 | 32.35 | Fiber Spacial Structure |
| 8 | 30 | 38.6 | 91.47 | Monofilament-like Material |
| 9 | 50 | 68.4 | 97.23 | Plate-like Material |

Example 3

A milano-rib knitted fabric having 16 courses/inch and 10 wales/inch is prepared by using four yarns of a viscose rayon filament 120 d/8 f in a flat knitting machine of 7GG as a basic fiber spatial structure.

This basic fiber spatial structure is immersed in water for 1 hour to swell the fibers of the viscose rayon filaments and then the basic fiber spatial structure is treated with a centrifugal dehydrator (2500 r.p.m.) for 5 minutes to remove excess water. The basic fiber spatial structure is then immersed in the aluminum chloride solution of 2.8 mol/l having a room temperature for 50 hours, and is treated with the centrifugal dehydrator for 5 minutes to remove excess solution. This basic fiber spatial structure is placed in a tubular shape electric furnace after being dried at 50° C. in a hot air dryer to burn the basic fiber spatial structure. An ash content $W_B$ of the basic fiber spatial structure with the aluminum chloride is 24%. A temperature of the furnace in the burning process is raised to 400° C. in nitrogen gas for 10 hours, and then from 400° C. to 1300° C. for 3 hours, and further, is raised from 1300° C. to 1400° C. for 40 hours. It is confirmed that this preform is the fiber spatial structure of an aluminum nitride by performing an identification of a peak by means of a wide angle X-ray. Even if a small force is applied on the refractory fiber spatial preform, the form of this preform is destroyed and becomes a powder-like material. However it is possible to use this preform in subsequent processes with careful handling.

After leaving the refractory fiber spatial preform comprising the aluminum nitride in an atmosphere of a temperature of 40° C. and a relative humidity of 95% for 24 hours, so that a water content can be absorbed into the preform, the preform is placed in a desiccator. After suction is applied to the desiccator to bring it to a vacuum, the preform is reacted in an atmosphere of trimethylsilane for 1 hour. The preform is then removed from the desiccator and dried at 100° C. in the hot air dryer. A pick up $W_A$ of the trimethylsilane on the preform is 8.5%. This preform is placed in the tubular shape electric furnace, to apply a sintering treatment to the preform. First, a temperature of the furnace is raised to 1300° C. in a blended gas of a nitrogen gas and an ethanol gas for 10 hours, and then is raised from 1300° C. to 1400° C. for 3 hours, and further, is kept at 1400° C. for 5 hours. Clear diffraction peaks of an aluminum nitride crystal and an silicon carbide crystal are obtained when measuring a wide angle X-ray diffraction of the obtained refractory fiber spatial structure, and it is confirmed that the refractory fiber spatial structure is mainly comprised of the aluminum nitride crystal and the silicon carbide crystal. The refractory fiber spatial structure of this sample has a shrunken form of a form of the original basic fiber spatial structure in a rigid state caused by bonding between refractory fiber-like materials constituting the refractory fiber spatial structure that is partially generated. A compression strength of the refractory fiber spatial structure is 0.8 kg/cm$^2$.

A point analysis of the fiber-like material constituting the refractory fiber spatial structure of Example 3 is performed for five points by an X-ray microanalyzer and is shown in FIGS. 3A to 3E as microphotographs. A magnitude of the photographs is 2,000 for the photographs in FIGS. 3A to 3D, and 7,500 for the photographs in FIG. 3E. The large magnitude is adopted for FIG. 3E to obtain as close as possible a view of an outer surface of the fiber-like material. Each cross point of a vertical line and a horizontal line in the photograph is a point to be analyzed, and corresponds to each point A to E illustrated in FIG. 1 used for explaining the construction of the fiber-like material in Example 1.

Table 2 shows that silicon used in the sintering process penetrates from an outside surface of the fiber-like material to an inside thereof.

Example 4

The basic fiber spatial structure used in Example 2 is used as a basic fiber spatial structure of Example 4.

This basic fiber spatial structure is immersed in water for 1 hour to swell fibers of the viscose rayon filaments and the basic fiber spatial structure is then treated with a centrifugal dehydrator (2500 r.p.m.) for 5 minutes to remove excess water. The basic fiber spatial structure is then immersed in compound solutions described in column A of Table 4 at a room temperature. The concentrations of the compounds are described in column B of Table 4, and the immersion times of the basic fiber spatial structure are described in column C of Table 4. The basic fiber spatial structure with the compound solution is treated with the centrifugal dehydrator for 5 minutes to remove excess solution, and is then placed in a box type electric furnace after being dried at 50° C. in a hot air dryer to burn the basic fiber spatial structure in air. The conditions of the burning process are described in column E of Table 4. The ash contents $W_B$ of the obtained fiber spatial structures, i.e., refractory fiber spatial preforms, are described in column D of Table 4. The porosity of the refractory fiber spatial preforms of the samples 1, 2 and 3 described in the Table 4 is 19.7%. It is confirmed that each preform is the fiber spatial structure of a crystalline compound described in column F of Table 4, by performing an identification of a peak by means of a wide angle X-ray. Even if a small force is applied on the refractory fiber spatial preform, the form of this preform is destroyed and becomes a powder-like material. However, it is possible to use this preform in subsequent process with careful handling.

Each refractory fiber spatial preform is immersed in compound solutions described in column G of Table 4, and excess solutions are removed by contact with a filter paper. Concentrations of the used compound solutions are described in column H of Table 4. Pick ups $W_A$ of the compounds on the preform are described in column J of Table 4. The refractory fiber spatial preform with the compound is placed in the box type electric furnace after heating at 100° C. in the hot air dryer to apply a sintering treatment to the refractory fiber spatial preform in air. The conditions of the sintering process are described in column I of Table 4. Clear diffraction peaks of crystals of crystalline compounds described in column K of Table 4 are obtained when measuring a wide angle X-ray diffraction of each obtained refractory fiber spatial structure, and it is confirmed that each refractory fiber structure is mainly comprised of the crystals of the crystalline compounds described in column K of Table 4. The obtained refractory fiber spatial structure has a shrunken form of the basic fiber spatial structure and becomes rigid because the fiber-like materials constituting the refractory fiber spatial structure are partially bonded. Compression strengths of the refractory fiber spatial structures are described in column L of Table 4.

Results of point analyses of samples 1, 4 and 5 performed for five points A to E illustrated in FIG. 1 by an X-ray microanalyzer are described in Table 2. Table 2 shows that elements of the refractory fiber spatial structure used in the sintering process penetrate from an outside surface of the fiber-like material to an inside thereof.

TABLE 4

| Sample No. | A Precursor of Refractory Crystalline Compound B | B Concentration | C Immersion Time (Hr) | D Ash Content (%) | E Burning Condition | F Refractory Crystalline Compound B |
|---|---|---|---|---|---|---|
| 1 | AlCl₃ | 2.8 mol/l | 50 | 24 | 50 hrs upto 400° C. 4 hrs upto 800° C. 5 hrs at 800° C. | γ-Alumina |
| 2 | AlCl₃ | 2.8 mol/l | 50 | 24 | 50 hrs upto 400° C. 4 hrs upto 800° C. 5 hrs at 800° C. | γ-Alumina |
| 3 | AlCl₃ | 2.8 mol/l | 50 | 24 | 50 hrs upto 400° C. 4 hrs upto 800° C. 5 hrs at 800° C. | γ-Alumina |
| 4 | ZrCl₄ YCl₃ | 2.0 mol/l 0.06 mol/l | 30 | 27 | 50 hrs upto 400° C. 4 hrs upto 600° C. 5 hrs at 600° C. | Zirconia |
| 5 | AlCl₃ SiO₂ Sol* MgCl₂ | 13.7 wt % 20.0 wt % 6.7 wt % | 50 | 47 | 50 hrs upto 400° C. 4 hrs upto 800° C. 5 hrs at 800° C. | Mainly γ-Alumina MgO |

| Sample No. | G Refractory Crystalline Compound A or Precursor thereof | H Concentration | I Sintering Condition | J Pick up (%) | K Compound Mainly Constituting Structure | L Compression Strength (kg/cm²) |
|---|---|---|---|---|---|---|
| 1 | Blended Material of Aluminium Lactate and Silicon Dioxide | 10 wt % | 5 hrs upto 400° C. 0.5 hr upto 1500° C. 2 hrs upto 1650° C. 3 hrs at 1650° C. | 3 | Mainly α-Alumina, Mullite | 3 |
| 2 | SnCl₄ | 30 wt % | 8 hrs upto 800° C. 5 hrs upto 1200° C. 10 hrs at 1200° C. | 13 | Mainly α-Alumina, Tin Dioxide | 2 |
| 3 | AlCl₃ MgCl₂ | 2.8 mol/l 0.05 mol/l | 5 hrs upto 400° C. 0.5 hr upto 1500° C. 2 hrs upto 1650° C. 3 hrs at 1650° C. | 9 | Mainly α-Alumina, Spinel | 5 |
| 4 | AlCl₃ | 2.8 mol/l | 5 hrs upto 800° C. 3 hrs upto 1600° C. 10 hrs at 1600° C. | 12 | Mainly α-Alumina, Zirconia | 4.5 |
| 5 | AlCl₃ | 2.8 mol/l | 5 hrs upto 800° C. 3 hrs upto 1500° C. 24 hrs at 1500° C. | 13 | Mainly Cordierite, α-Alumina | 2.5 |

*SiO₂ Sol: Snowtex-O Supplied from Nissan Chemical Industries, Ltd.

Example 5

In Example 5, various types of basic fiber spatial structure depending on the application of the refractory fiber spatial structure in accordance with the present invention can be used. For example, a woven fabric, a knitted fabric, a woven fabric or a knitted fabric having a plurality of piles or a nonwoven fabric can be used for the basic fiber spatial structure.

The following basic fiber spatial structures are used in Example 5.

Basic fiber spatial structure I

A nonwoven fabric having a thickness of 5 mm and a weight per unit area of 450 g/m$^2$ and manufactured by applying a needle punching process on a web of cuprammonium rayon staples of 1.5 d×38 mm.

Basic fiber spatial structure II

A plain-weave woven fabric having 107 ends per inch and 70 picks per inch and using cuprammonium rayon filaments of 75 d/50 f.

Basic fiber spatial structure III

A pile woven fabric having the following constitution and manufactured by weaving viscose rayon filaments as a pile yarn and cuprammonium rayon filaments as a ground warp yarn and weft yarn in a velvet loom.

| Ground Warp | 100 d/60 f | 80 ends per inch |
| --- | --- | --- |
| Weft | 100 d/60 f | 80 picks per inch |
| Pile Warp | 120 d/44 f | 40 ends per inch |

Basic fiber spatial structure IV

A rib knitted fabric having 17 courses per inch and 14 wales per inch is prepared by using two yarns of a viscose rayon filament 120 d/8 f in a 10GG flat-knitting machine.

Each basic fiber spatial structure I, II, III, and IV is applied with the same treatment as that used in Example 3, to obtain a basic fiber spatial structure including a precursor of a refractory crystalline compound. Each obtained basic fiber spatial structure is burned under the same condition as that used in Example 1, to make each refractory fiber spatial preform. An ash content $W_B$ of each refractory fiber spatial preform is 24%. It is confirmed that this preform is a fiber spatial structure of γ-alumina by performing an identification of a peak by means of a wide angle X-ray. Even if a small force is applied on the refractory fiber spatial preform, the form of this preform is destroyed and becomes a powder-like material. However, it is possible to use this preform in subsequent processes with careful handling.

Each refractory fiber spatial preform is immersed in a water solution of zirconium chloride of 2 mol/l and yttrium chloride of 0.06 mol/l (which is used as a stabilizer), excess solutions thereof are removed by suction, and then each preform is dried at 100° C. by a hot air dryer. The pick up $W_A$ of the zirconium chloride on each preform is 13%. Each refractory fiber spatial preform with the zirconium chloride is placed in the box type electric furnace to apply a sintering treatment to the preform in air. A temperature of the furnace in the sintering process is raised to 400° C. for 5 hours, and then is raised from 400° C. to 1500° C. for a half hour, and further, is raised from 1500° C. to 1600° C. for 2 hours, and finally, is kept at 1600° C. for 4 hours. Clear diffraction peaks of an α-alumina crystal and a zirconium crystal are obtained when measuring a wide angle X-ray diffraction of the obtained refractory fiber spatial structure, and it is confirmed that each refractory fiber spatial structure is mainly comprised of the α-alumina crystal and the zirconium crystal. The obtained refractory fiber spatial structure has a shrunken form of the basic fiber spatial structure and becomes rigid because the fiber-like materials constituting the refractory fiber spatial structure are partially bonded.

Example 6

An α-alumina supplied by Showa Denko Co., Ltd. as AL-160SG-3, having 99.52% α-Al$_2$O$_3$, a mean particle diameter of 0.5 μm, and a true specific gravity of 3.91, is prepared as a refractory crystalline compound B described hereinbefore, and a polyurethane is prepared as an organic material.

The polyurethane is dissolved in a dimethylformamide (hereinafter, referred as DMF) to a solution of 20 wt %. While a liquid, in which 1600 g of a powder of the α-alumina is dispersed in the DMF of 200 ml, is prepared. The polyurethane solution is blended with the α-alumina liquid while the α-alumina liquid is filtrated by a mesh screen filter, and is stirred for 12 hours. Next a vessel including the blended liquid is brought to a vacuum state while stirring for 2 hours, so that the blended liquid is deformed. The polyurethane solution including the α-alumina is spun under the following spinning condition.

| Diameter of nozzle hole: | 1 mm |
| --- | --- |
| Number of holes: | 5 |
| Extrusion quantity: | 6.25 ml/min |
| Spinning speed: | 5.0 m/min |
| Spinning bath: | Water at 60° C. |
| Spinning draft: | 3.08 |

An α-aluminum including a polyurethane filament of 7500 d is obtained, having a strength of 175 g and an elongation of 350%. A covering yarn is manufactured by wrapping the polyurethane filament with a polyester false twist yarn of 100 d/24 at a wrapping number of 500 T/M. A rib knitted fabric is prepared by using this covering yarn in a 10GG flat knitting machine to make a basic fiber spatial structure. This basic fiber spatial structure is placed in a box type electric furnace to burn the basic fiber spatial structure. A temperature of the furnace in the burning process is raised to 400° C. for 50 hours, and then from 400° C. to 1300° C. for 10 hours, and further, is kept at 1300° C. for 24 hours. The obtained fiber spatial structure, i.e., a refractory fiber spatial preform, has an ash content $W_B$ of 91%. It is confirmed that this preform is a fiber spatial structure of the α-alumina by performing an identification of a peak by means of a wide angle X-ray. The strength of this preform is extremely weak and cannot be measured. However, it is possible to use this preform in subsequent processes with careful handling.

The preform is immersed in a suspending solution of 10 wt % of a blended material of an aluminum lactate and a silicon oxide, which blended material includes 26.5% Al$_2$O$_3$, 12% SiO$_2$ and a 27% lactic acid, supplied by Taki Kagaku Co., Ltd. as Takiserum 2500, and then excess solution is removed by a centrifugal dehydrator. Further, the preform is dried at 100° C. in a hot air dryer. Pick up $W_A$ of the blended material on the preform is 4.2%. The preform with the blended material is placed in a box type electric furnace to apply a sintering treatment to the preform. The temperature of the furnace in the sintering process is raised to 1500° C. for 4 hours, and then from 1500° C. to 1600° C. for 3 hours, and further, is kept at 1600° C. for 4 hours. Clear diffraction peaks of an α-alumina crystal and a mullite crystal are obtained when measuring the obtained refractory fiber spatial structure by a wide angle X-ray diffraction, and it is confirmed that the each refractory fiber spatial structure is mainly comprised of the α-alumina crystal and the mullite crystal. The obtained refractory fiber spatial structure has a shrunken form of the basic fiber spatial structure and becomes rigid because the fiber-like materials constituting the refractory fiber spatial structure are partially bonded. A compression strength of the refractory fiber spatial structure is 1.5 kg/cm$^2$.

Example 7

The following basis fiber spatial structures are used in this Example 7.

Basic fiber spatial structure V

A rib knitted fabric having the same constitution as that of a rib knitted fabric used in Example 2.

Basic fiber spatial structure VI

A rib knitted fabric having 20 courses/inch and 15 wales/inch prepared by using 3 yarns of Nylon 6 70 d/24 f in a 10GG flat knitting machine.

Each basic fiber spatial structure is treated with stannic chloride and disodium hydrogen phosphate under the same conditions as used in Example 1. However, the number of the treatment repetitions is changed from five to four for the basic fiber spatial structure V and to three for the basic fiber spatial structure VI, and the sodium silicate treatment is omitted. An ash content $W_B$ of the basic fiber spatial structure V with the above-mentioned compound is 56% and the ash content $W_B$ of the basic fiber spatial structure VI with the compound is 53%. Each basic fiber spatial structure is burned under the same condition as that used in Example 1. The obtained fiber spatial structures, i.e., refractory fiber spatial preform, have a white color and it is confirmed that each preform is comprised mainly of tin oxide by performing an identification of a peak by means of a wide angle X-ray.

Each refractory fiber spatial preform is coated with a refractory crystalline compound material A described hereinbefore to obtain a refractory fiber spatial structure. The same compound and method as that used in Example 5 is used for the preform manufactured from the basic fiber spatial structure V, and the same compound and method as that used in Example 1 is used for the preform manufactured from the basic fiber spatial structure VI. Pick ups $W_A$ of the compounds are 13% for the former and 8.3% for the latter.

Each preform with the compound is placed in a box type electric furnace to apply a sintering treatment to the preform. A temperature of the furnace in the sintering process is raised to 400° C. in air for 5 hours, and then from 400° C. to 1300° C. for a half hour, and further, from 1300° C. to 1400° C. for 2 hours, and finally, is kept at 1400° C. for 4 hours for the preform manufactured from the basic fiber spatial structure V, and the temperature of the preform manufactured from the basic fiber spatial structure VI in the sintering process is raised to 1200° C. in the air for 4 hours, and then from 1200° C. to 1400° C. for 3 hours, and further, is kept at 1400° C. for 4 hours.

Clear diffraction peaks of a tin dioxide crystal and a zirconia crystal are obtained when measuring a wide angle X-ray diffraction of the obtained refractory fiber spatial structure manufactured from the basic fiber structure V and it is confirmed that the refractory fiber spatial structure is mainly comprised of the tin dioxide crystal and the zirconia crystal. Clear diffraction peaks of the tin oxide crystal, an α-alumina crystal and the zirconium crystal are obtained when measuring the wide angle X-ray diffraction of the obtained refractory fiber spatial structure manufactured from the basic fiber structure VI and it is confirmed that the refractory fiber spatial structure is mainly comprised of the tin oxide crystal, the α-alumina crystal and the zirconium crystal. A compression strength of this refractory fiber spatial structure is 0.37 kg/cm$^2$.

EXAMPLE 8

A rib knitted fabric having 17 courses/inch and 14 wales/inch is prepared by using two yarns of a viscose rayon filament 120 d/8 f in a 7GG flat knitting machine as a basic fiber spatial structure.

This basic fiber spatial structure is immersed in water for 1 hour to swell the fibers constituting the basic fiber spatial structure and the basic fiber spatial structure is then treated with a centrifugal dehydrator (2500 r.p.m.) for 5 minutes to remove excess water. The basic fiber spatial structure is immersed in a trimethylchlorosilane solution at a room temperature for 1 hour, and is dried at 50° C. in a hot air dryer to remove excess solution. An ash content $W_B$ of the basic fiber spacil structure with the trimethylchlorosilane is 24%. This basic fiber spatial structure with the trimethylchlorosilane is placed in a tubular shape electric furnace to burn the basic fiber spatial structure. A temperature of the furnace in this first burning process is raised to 400° C. in nitrogen gas for 2 hours, and then is kept at 400° C. for 2 hours, so that any volatile organic material is removed. Next, the thus obtained fiber spatial structure, i.e., a structure constituted with a residue of a carbon fiber-like material, is further burned in a blended gas of ammonia and nitrogen to make a refractory fiber spatial preform. A temperature of the furnace in the second burning process is raised to 1200° C. for 1 hour, and then from 1200° C. to 1400° C. for 15 hours, and further, is kept at 1400° C. for 5 hours. It is confirmed that this preform is the fiber spatial structure of a silicon nitride by performing an identification of a peak by means of a wide angle X-ray. Even if a small force is applied on the preform, the form of this preform is destroyed and becomes a powder-like material. However, it is possible to use this preform in subsequent processes with careful handling.

The preform is immersed in a water solution of 10 wt % of an aluminum lactate supplied by Taki Kagaku Co., Ltd. and excess solution is removed by placing the preform in contact with a filter paper, and the preform is then dried at 100° C. in the hot air dryer. A pick up $W_A$ of the aluminum lactate is 13%. The preform with the aluminum lactate is placed in the tubular shape electric furnace to apply a sintering treatment to the preform. A temperature of the furnace in the sintering process is raised to 800° C. in air for 8 hours, and after removing a organic material, is raised from 800° C. to 1100° C. for 2 hours, and further, is kept at 1100° C. for 3 hours. Clear diffraction peaks of a silicon nitride crystal and an alumina crystal are obtained when measuring a wide angle X-ray diffraction of the obtained refractory fiber spatial structure, and it is confirmed that the refractory fiber spatial structure is mainly comprised of the silicon nitride crystal and the alumina crystal. The obtained refractory fiber spatial structure has a shrunken form of the basic fiber spatial structure and becomes rigid because the fiber-like materials constituting the refractory fiber spatial structure are partially bonded.

EXAMPLE 9

A pile woven fabric having the following constitution and manufactured by weaving a viscose rayon filament in a velvet loom is prepared as a basic fiber spatial structure.

| Ground warp | 100 d/50 f | 80 ends per inch |
|---|---|---|
| Weft | 100 d/50 f | 80 picks per inch |
| Pile warp | 100 d/50 f | 40 ends per inch |
| Height of pile | 20 mm | |

This basic fiber spatial structure is immersed in water for 1 hour to swell the fiber constituting the basic fiber spatial structure and the basic fiber spatial structure is then treated with a centrifugal dehydrator (2500 r.p.m.) for 5 minutes to remove excess water. The basic fiber spatial structure is immersed in a silicone tetrachloride liquid at a room temperature for 1 hour, and excess solution is removed by heat. An ash content $W_B$ of the basic fiber spatial structure with the silicon tetrachloride is 32%. After the basic fiber spatial structure with the silicon tetrachloride is dried at 50° C. in a hot air dryer, the basic fiber spatial structure is placed in a tubular shape electric furnace having for burning. A temperature of the furnace in this first burning process is raised to 200° C. in air for 10 hours, so that a volatile organic material is removed and a structure constituted with a residue of a carbon fiber-like material is obtained. Next, the air in the furnace is changed to nitrogen gas and under a condition that a dried hydrogen gas is flowing in the furnace, a temperature of the furnace in a second burning process is raised to 1400° C. for 4 hours, and is then kept at 1400° C. for 5 hours to burn the structure. It is confirmed that this preform is the fiber spatial structure of a silicon carbide, by performing an identification of a peak by means of a wide angle X-ray. Even if a small force is applied on the preform, the form of this preform is destroyed and becomes a powder-like material. However, it is possible to use this preform in subsequent process with careful handling.

The preform is immersed in a water solution of 10 wt % of an aluminum lactate supplied by Taki Kagaku Co., Ltd., and excess solution is removed by placing the preform in contact with a filter paper. The preform is then dried at 100° C. in the hot air dryer. A pick up $W_A$ of the aluminum lactate is 4%. The preform with the aluminum lactate is placed in a box type electric furnace to apply a sintering treatment to the preform. A temperature of the furnace in the sintering process is raised to 800° C. in air for 8 hours, and after an organic material is removed, is raised from 800° C. to 1100° C. for 2 hours, and further, is kept at 1100° C. for 4 hours. Clear diffraction peaks of a silicon nitride crystal and α-alumina crystal are obtained when the obtained refractory fiber spatial structure is measured by a wide angle X-ray diffraction, and it is confirmed that the refractory fiber spatial structure is mainly comprised of the silicon nitride crystal and the α-alumina crystal. The obtained refractory fiber spatial structure has a shrunken form of the basic fiber spatial structure and becomes rigid because the fiber-like materials constituting the refractory fiber spatial structure are partially bonded.

Example 10

The basic fiber spatial structure used in Example 9 is used as a basic fiber spatial structure of this example.

This basic fiber spatial structure is immersed in water for 1 hour to swell the fiber constituting the basic fiber spatial structure and the basic fiber spatial structure is then treated with a centrifugal dehydrator (2500 r.p.m.) for 5 minutes to remove excess water. The basic fiber spatial structure is immersed in a blended water solution 2 mol/l of a zirconium chloride and a 0.06 mol/l of yttrium chloride for 30 hours, and the basic fiber spatial structure is then treated with a centrifugal dehydrator (2500 r.p.m.) for 5 minutes to remove excess water. After the basic fiber spatial structure is dried at 50° C. in a hot air dryer, the basic spatial structure is placed in a box type electric furnace to burn the structure. A temperature of the furnace in the burning process is raised to 400° C. in air for 50 hours, to decompose and remove an organic material, and is then raised from 400° C. to 700° C. for 4 hours, and further, is kept at 700° C. for 5 hours. An ash content $W_B$ of the obtained refractory fiber spatial structure is 27%. It is confirmed that this preform is the fiber spatial structure of a zirconium by performing an identification of a peak by means of a wide angle X-ray. Even if a small force is applied on the preform, the form of this preform is destroyed and becomes a powder-like material. However, it is possible to use this preform in subsequent processes with careful handling.

After the preform is stood in an atmosphere at a temperature of 60° C. and a relative humidity of 95% for 5 hours, to cause the preform to absorb moisture, the preform is immersed in a silicon tetrachloride liquid for 1 hour, and the preform is then dried at 100° C. in a hot air dryer. A pick up $W_A$ of the silicon tetrachloride is 18%. The preform with the silicon tetrachloride is placed in a tubular shape electric furnace to apply a sintering treatment to the preform. A temperature of the furnace in the sintering process is raised to 1400° C. in a carbon monoxide gas for 8 hours, and is then kept at 1400° C. for 4 hours. Clear diffraction peaks of a zirconia crystal and a silicon carbide crystal are obtained when measuring the obtained refractory fiber spatial structure by a wide angle X-ray diffraction, and it is confirmed that the refractory fiber spatial structure is mainly comprised of the zirconia crystal and the silicon carbide crystal. The obtained refractory fiber spatial structure has a shrunken form of the basic fiber spatial structure and becomes rigid because the fiber-like materials constituting the refractory fiber spatial structure are partially bonded.

Example 11

A refractory fiber spatial preform used in Example 2 is used as a refractory fiber spatial preform of this example. The preform is coated with a blended material of an aluminum lactate and a silicon oxide by the same method as that used in Example 2, except that a concentration of a water solution is changed from 10 wt % to 20 wt %. A pick up $W_A$ of the blended material is 9%. 30 sheets of the preform with the blended material are piled together and the same sintering process as that used in Example 2 is applied.

A state of a crystal and a form of the obtained refractory fiber spatial structure are the same as that of Example 2, and the refractory fiber spatial structure has a rigid form because each layer of the refractory fiber spatial preforms is firmly bonded. A compression strength of the piled refractory fiber spatial structure is 380 kg/cm².

Example 12

An example in which two types of refractory fiber spatial structure are used in a piled state is described in this Example 12.

In Example 12, a structure before a refractory fiber spatial structure described as in Example 11, to which a sintering treatment is applied (hereinafter referred to as a presintering structure X), and a structure before a refractory fiber spatial structure described as sample 1 of Example 4 (see Table 4) to which a sintering treatment is applied (hereinafter referred to as a presintering structure Y), are prepared. 30 sheets of the presintering structures X and 30 sheets of the presintering structures Y are alternately piled together and are placed in a box type electric furnace to apply a sintering treatment to the piled structures. A temperature of the furnace in the sintering process is raised to 800° C. in air for 8 hours, and after an organic material is removed, is raised from 800° C. to 1200° C. for a half hour, then is raised from 1200° C. to 1400° C. for 2 hours, and further, is kept at 1400° C. for 3 hours.

The obtained refractory fiber spatial structure has a shrunken form of a plurality of basic fiber spatial structures and becomes rigid because the fiber-like materials constituting the piled refractory fiber spatial structure are partially bonded. A compression strength of the piled refractory fiber spatial structure is 150 kg/cm².

To confirm a fluid permeability of the refractory fiber spatial structure in accordance with the present invention, a particulate trapping efficiency and an initial pressure loss of the refractory fiber spatial structures of Example 12 are measured under the following conditions.

Particle used: particle of a stearic acid
Diameter of particle: 0.3 μm
Size of sample to be measured: 28 cm²
Air flow of air including particles: 25 l/min The obtained results are as follows
Particle Trapping Efficiency: 6.41%
Initial Pressure Loss: 4.4 mm H₂O

Example 13

An example in which a refractory fiber spatial structure in accordance with the present invention is used with a heating element is described in Example 13.

A presintering structure X and a presintering structure Y described in Example 12 are also used in Example 13, and each presintering structure is cut to a square segment 20 cm×20 cm, respectively.

A wire of iron•chrome•aluminum alloy 1 mmφ, supplied by Kanthal Gadelius Co., Ltd. as KANTHAL ® A-1, is used as the heating element.

First, 5 segments of the presintering structure X and 5 segments of the presintering structure Y are alternately piled together to make a segment group. The heating elements are arranged in parallel at a distance of 10 mm on the segment group. Another or second segment group is arranged on the heating elements. Further the heating elements are arranged in parallel at the distance of 10 mm on the second segment group, but a lengthwise direction of the heating element in this stage is perpendicular to that of the heating element in a first stage. Finally a third segment group is arranged on the second heating elements. The thus obtained piled structure comprising the presintering structure X, the presintering structure Y, and the heating element is placed in a box type electric furnace to apply a sintering treatment to the piled structure. The temperature elevation of the furnace in the sintering process is applied in the same order as that used in Example 12.

The obtained refractory fiber spatial structure has a shrunken form of a plurality of basic fiber spatial structures and becomes rigid because the fiber-like material constituting the piled refractory fiber spatial structure are partially bonded.

Since the refractory fiber spatial structure in accordance with the present invention has a fluid permeability, the refractory fiber spatial structure can be used as a filter or the like, as described hereinbefore. Therefore, a filter unit for a diesel engine is made of the refractory fiber spatial structure of Example 123 in such a way that all exhaust gas of the diesel engine (1951 cc) passes through the refractory fiber spatial structure, and is attached to an exhaust gas pipe of the diesel engine. The diesel engine is driven at 700 r.p.m., and an initial pressure loss and a pressure loss after one hour are measured. The obtained results are as follows

| | |
|---|---|
| Initial pressure loss: | 45 mm H₂O |
| Pressure loss after 1 hour: | 200 mm H₂O |
| Particulate Trapping Efficiency of a diesel engine particulate: | 71% |

Next, to burn the diesel engine particulate trapped in the filter unit, an electric current of 50V and 55A is passed through the heating element of the filter unit for 5 minutes after decreasing the amount of exhaust gas passing through the filter unit to 25%. A value of pressure loss when the amount of the exhaust gas is returned to the original state is 50 mm H₂O, and it is confirmed that the diesel engine particulates trapped in the refractory fiber spatial structure can be substantially removed by heating the heating element of the refractory fiber spatial structure of Example 13. When the above-mentioned experiments are repeated, similar results are obtained.

The filter unit manufactured by piling the refractory fiber spatial structures with the heating elements as in Example 13 has an excellent trapping ability as a diesel engine particulate filter, and a feature whereby regeneration of the filter can be easily attained.

We claim:

1. A rigid form refractory fiber spatial structure having:
    a) a porous core structure consisting of fiber-like materials having an elongated shape corresponding to the shape of a staple fiber or a filament and comprising a refractory crystalline compound B, the porosity of which is between 5% and 50%, said core structure being formed by applying a precursor of said refractory crystalline compound B to a fiber spatial structure containing organic material and burning said structure to decompose said organic material and form said refractory crystalline compound B; and
    b) a skin portion comprising a refractory crystalline compound A; said skin portion being formed by applying a refractory crystalline compound A on the surface of said core structure and sintering said refractory crystalline compound A and said core structure so that a portion of said refractory crystalline compound A is impregnated into said porous core structure.

2. A rigid form refractory fiber spatial structure according to claim 1, wherein said refractory crystalline compound A is an oxide.

3. A rigid form refractory fiber spatial structure according to claim 1, wherein said refractory crystalline compound B is an oxide.

4. A rigid form refractory fiber spatial structure according to claim 1, wherein a compression strength of said refractory fiber spatial structure is between 0.3 kg/cm$^3$ and 500 kg/cm$^3$.

* * * * *